United States Patent
Carlton et al.

(10) Patent No.: US 8,014,367 B2
(45) Date of Patent: Sep. 6, 2011

(54) SYSTEM FOR APPLICATION SERVER AUTONOMOUS ACCESS ACROSS DIFFERENT TYPES OF ACCESS TECHNOLOGY NETWORKS

(75) Inventors: Alan Gerald Carlton, Mineola, NY (US); Narayan Parappil Menon, Syosset, NY (US); Debashish Purkayastha, Pottstown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1253 days.

(21) Appl. No.: 10/987,773

(22) Filed: Nov. 12, 2004

(65) Prior Publication Data

US 2005/0141447 A1 Jun. 30, 2005

Related U.S. Application Data

(60) Provisional application No. 60/519,440, filed on Nov. 12, 2003, provisional application No. 60/623,091, filed on Oct. 28, 2004.

(51) Int. Cl.
*H04Q 7/24* (2006.01)
*H04J 3/16* (2006.01)

(52) U.S. Cl. .................................... 370/338; 370/466
(58) Field of Classification Search .................. 370/338, 370/466
See application file for complete search history.

(56) References Cited

U.S. PATENT DOCUMENTS

| | | | |
|---|---|---|---|
| 3,952,610 A | 4/1976 | Hope et al. | |
| 5,611,050 A | 3/1997 | Theimer et al. | |
| 5,666,650 A | 9/1997 | Turcotte et al. | |
| 5,787,347 A | 7/1998 | Yu et al. | |
| 5,826,188 A | 10/1998 | Tayloe et al. | |
| 5,862,480 A | 1/1999 | Wild et al. | |
| 5,930,700 A | 7/1999 | Pepper et al. | |
| 5,946,634 A * | 8/1999 | Korpela | 455/552.1 |
| 5,999,816 A | 12/1999 | Tiedemann, Jr. et al. | |
| 6,057,782 A | 5/2000 | Koenig | |
| 6,061,565 A | 5/2000 | Innes et al. | |
| 6,112,093 A | 8/2000 | Nordlund | |
| 6,115,608 A | 9/2000 | Duran et al. | |
| 6,128,490 A | 10/2000 | Shaheen et al. | |
| 6,201,968 B1 | 3/2001 | Ostroff et al. | |

(Continued)

FOREIGN PATENT DOCUMENTS

EP 0852448 7/1998

(Continued)

OTHER PUBLICATIONS

3GPP TSG CN #9, Hawaii, USA, Sep. 20-22, 2000, Tdoc 3GPP NP-000451.

(Continued)

*Primary Examiner* — Andrew Lee
(74) *Attorney, Agent, or Firm* — Volpe and Koenig, P.C.

(57) ABSTRACT

An Application Server Autonomous Access (ASAA) system for providing autonomous access to a wireless infrastructure by devices employing different types of access technology. The system includes a server, having an associated data storage device, for storing at least one policy, and a plurality of subnetworks, coupled to server, for providing access to the server. The plurality of subnetworks employ at least two different types of access technology. A plurality of wireless transmit/receive units (WTRUs) are wirelessly coupled to at least one of the subnetworks. The server monitors the wireless coupling and, depending upon the at least one policy, switches the WTRUs between different ones of the subnetworks.

18 Claims, 7 Drawing Sheets

U.S. PATENT DOCUMENTS

| | | |
|---|---|---|
| 6,243,581 B1 | 6/2001 | Jawanda |
| 6,304,755 B1 | 10/2001 | Tiedemann et al. |
| 6,353,602 B1 | 3/2002 | Cheng et al. |
| 6,385,772 B1 | 5/2002 | Courtney |
| 6,400,265 B1 | 6/2002 | Saylor et al. |
| 6,400,951 B1 | 6/2002 | Vaara |
| 6,470,184 B1 | 10/2002 | Machida |
| 6,487,410 B1 | 11/2002 | Kontio et al. |
| 6,546,246 B1 | 4/2003 | Bridges et al. |
| 6,591,103 B1 | 7/2003 | Dunn et al. |
| 6,594,242 B1 | 7/2003 | Kransmo |
| 6,600,758 B1 | 7/2003 | Mazur et al. |
| 6,615,048 B1 | 9/2003 | Hayashi |
| 6,643,513 B2 | 11/2003 | Timonen et al. |
| 6,668,175 B1 | 12/2003 | Almgren et al. |
| 6,680,923 B1 | 1/2004 | Leon |
| 6,718,178 B1 | 4/2004 | Sladek et al. |
| 6,721,565 B1 | 4/2004 | Ejzak et al. |
| 6,735,433 B1 | 5/2004 | Cervantes |
| 6,768,726 B2 * | 7/2004 | Dorenbosch et al. ......... 370/331 |
| 6,771,964 B1 | 8/2004 | Einola et al. |
| 6,801,772 B1 | 10/2004 | Townend et al. |
| 6,826,154 B2 | 11/2004 | Subbiah et al. |
| 6,829,481 B2 | 12/2004 | Souissi |
| 6,832,093 B1 | 12/2004 | Ranta |
| 6,845,238 B1 | 1/2005 | Muller |
| 6,894,988 B1 * | 5/2005 | Zehavi ........................... 370/278 |
| 6,961,561 B2 | 11/2005 | Himmel et al. |
| 6,963,745 B2 | 11/2005 | Singh et al. |
| 6,973,309 B1 | 12/2005 | Rygula et al. |
| 7,006,828 B1 | 2/2006 | Czaja et al. |
| 7,009,952 B1 | 3/2006 | Razavilar et al. |
| 7,016,691 B2 | 3/2006 | Yaguchi et al. |
| 7,089,008 B1 | 8/2006 | Back et al. |
| 7,092,710 B1 | 8/2006 | Stoter et al. |
| 7,092,743 B2 | 8/2006 | Vegh |
| 7,096,015 B2 | 8/2006 | Bridges et al. |
| 7,133,384 B2 | 11/2006 | Park et al. |
| 7,146,636 B2 * | 12/2006 | Crosbie .............................. 726/7 |
| 7,149,521 B2 * | 12/2006 | Sundar et al. ............... 455/435.1 |
| 7,155,225 B2 * | 12/2006 | Segal et al. .................... 455/436 |
| 7,164,923 B2 | 1/2007 | Tsunomoto et al. |
| 7,181,218 B2 | 2/2007 | Ovesjo et al. |
| 7,200,401 B1 | 4/2007 | Hulkkonen et al. |
| 7,206,318 B2 * | 4/2007 | Keller ........................... 370/433 |
| 7,254,119 B2 * | 8/2007 | Jiang et al. .................... 370/328 |
| 7,263,367 B1 | 8/2007 | Sabot |
| 7,283,507 B2 | 10/2007 | Buckley et al. |
| 7,376,098 B2 | 5/2008 | Loeffler et al. |
| 7,418,267 B2 * | 8/2008 | Karaoguz ................... 455/456.1 |
| 7,486,635 B2 | 2/2009 | Okanoue et al. |
| 7,508,799 B2 | 3/2009 | Sumner et al. |
| 7,610,049 B2 | 10/2009 | Watanabe |
| 2002/0022478 A1 * | 2/2002 | Iwao ............................. 455/419 |
| 2002/0024937 A1 | 2/2002 | Barnard et al. |
| 2002/0025810 A1 | 2/2002 | Takayama et al. |
| 2002/0032034 A1 | 3/2002 | Tiedemann et al. |
| 2002/0032748 A1 | 3/2002 | Myojo |
| 2002/0068570 A1 | 6/2002 | Abrol et al. |
| 2002/0082044 A1 | 6/2002 | Davenport |
| 2002/0120749 A1 | 8/2002 | Widegren et al. |
| 2002/0136226 A1 | 9/2002 | Christoffel et al. |
| 2002/0146021 A1 | 10/2002 | Schwartz et al. |
| 2002/0147008 A1 | 10/2002 | Kallio |
| 2002/0147012 A1 | 10/2002 | Leung et al. |
| 2002/0180582 A1 | 12/2002 | Nielsen |
| 2003/0002525 A1 | 1/2003 | Grilli et al. |
| 2003/0003933 A1 | 1/2003 | Deshpande et al. |
| 2003/0012156 A1 | 1/2003 | Fukuda |
| 2003/0013443 A1 | 1/2003 | Willars et al. |
| 2003/0013463 A1 | 1/2003 | Yen |
| 2003/0022740 A1 | 1/2003 | You |
| 2003/0045322 A1 | 3/2003 | Baer et al. |
| 2003/0046546 A1 | 3/2003 | Endo |
| 2003/0080996 A1 | 5/2003 | Lavin et al. |
| 2003/0081567 A1 | 5/2003 | Okanoue et al. |
| 2003/0092444 A1 * | 5/2003 | Sengodan et al. ............ 455/436 |
| 2003/0100307 A1 | 5/2003 | Wolochow et al. |
| 2003/0114158 A1 | 6/2003 | Soderbacka et al. |
| 2003/0118015 A1 | 6/2003 | Gunnarsson et al. |
| 2003/0119480 A1 | 6/2003 | Mohammed |
| 2003/0123479 A1 * | 7/2003 | Lee et al. ....................... 370/466 |
| 2003/0125028 A1 | 7/2003 | Reynolds |
| 2003/0142641 A1 | 7/2003 | Sumner et al. |
| 2003/0148777 A1 | 8/2003 | Watanabe et al. |
| 2003/0148786 A1 | 8/2003 | Cooper et al. |
| 2003/0149875 A1 | 8/2003 | Hosaka |
| 2003/0163558 A1 | 8/2003 | Cao et al. |
| 2003/0174667 A1 | 9/2003 | Krishnamurthi et al. |
| 2003/0179726 A1 | 9/2003 | Forssell et al. |
| 2003/0206533 A1 | 11/2003 | Charas |
| 2003/0208602 A1 | 11/2003 | Bhalla et al. |
| 2004/0002343 A1 | 1/2004 | Brauel et al. |
| 2004/0014474 A1 | 1/2004 | Kanada |
| 2004/0018829 A1 * | 1/2004 | Raman et al. ................. 455/406 |
| 2004/0028009 A1 * | 2/2004 | Dorenbosch et al. ......... 370/329 |
| 2004/0029587 A1 | 2/2004 | Hulkkonen et al. |
| 2004/0033805 A1 | 2/2004 | Verma et al. |
| 2004/0058717 A1 | 3/2004 | McDonnell et al. |
| 2004/0063426 A1 | 4/2004 | Hunkeler |
| 2004/0068571 A1 | 4/2004 | Ahmavaara |
| 2004/0090937 A1 | 5/2004 | Chaskar et al. |
| 2004/0092259 A1 | 5/2004 | Blanc et al. |
| 2004/0100913 A1 | 5/2004 | Kalliokulju et al. |
| 2004/0103204 A1 * | 5/2004 | Yegin ............................ 709/229 |
| 2004/0105434 A1 | 6/2004 | Baw |
| 2004/0114553 A1 * | 6/2004 | Jiang et al. .................... 370/328 |
| 2004/0124241 A1 | 7/2004 | Shostak |
| 2004/0127241 A1 | 7/2004 | Shostak |
| 2004/0157600 A1 | 8/2004 | Stumpert et al. |
| 2004/0176103 A1 | 9/2004 | Trossen et al. |
| 2004/0185845 A1 | 9/2004 | Abhishek et al. |
| 2004/0203732 A1 | 10/2004 | Brusilovsky et al. |
| 2004/0203748 A1 | 10/2004 | Kappes et al. |
| 2004/0203773 A1 | 10/2004 | Balasubramanian et al. |
| 2004/0203873 A1 | 10/2004 | Gray |
| 2004/0203890 A1 | 10/2004 | Karaoguz et al. |
| 2004/0218605 A1 * | 11/2004 | Gustafsson et al. ........ 370/395.2 |
| 2004/0235455 A1 * | 11/2004 | Jiang ............................. 455/411 |
| 2004/0264410 A1 | 12/2004 | Sagi et al. |
| 2005/0025164 A1 * | 2/2005 | Kavanagh et al. ............ 370/401 |
| 2005/0047373 A1 | 3/2005 | Kojima |
| 2005/0059410 A1 | 3/2005 | Trossen et al. |
| 2005/0064877 A1 | 3/2005 | Gum et al. |
| 2005/0070289 A1 | 3/2005 | Vestama et al. |
| 2005/0090259 A1 | 4/2005 | Jain et al. |
| 2005/0107093 A1 | 5/2005 | Dowling |
| 2005/0153725 A1 * | 7/2005 | Naghian et al. ............... 455/520 |
| 2005/0176445 A1 | 8/2005 | Qu et al. |
| 2005/0177733 A1 * | 8/2005 | Stadelmann et al. ......... 713/185 |
| 2005/0181776 A1 | 8/2005 | Verma et al. |
| 2005/0202791 A1 | 9/2005 | Krause et al. |
| 2005/0250491 A1 * | 11/2005 | Roy ............................... 455/428 |
| 2005/0288019 A1 | 12/2005 | Park et al. |
| 2006/0004643 A1 * | 1/2006 | Stadelmann et al. ........... 705/34 |
| 2006/0052100 A1 | 3/2006 | Almgren |
| 2006/0056448 A1 | 3/2006 | Zaki et al. |
| 2006/0084440 A1 | 4/2006 | Bakri |
| 2006/0194582 A1 | 8/2006 | Cooper |
| 2006/0291455 A1 | 12/2006 | Katz et al. |
| 2006/0293053 A1 | 12/2006 | Zanaty |
| 2007/0072603 A1 * | 3/2007 | Wang ............................ 455/427 |
| 2007/0093201 A1 * | 4/2007 | Hsu et al. .................... 455/3.04 |
| 2007/0112948 A1 * | 5/2007 | Uhlik ............................ 709/223 |
| 2007/0208864 A1 * | 9/2007 | Flynn et al. ................... 709/227 |
| 2007/0217366 A1 | 9/2007 | Sagi et al. |
| 2007/0259653 A1 | 11/2007 | Tang et al. |
| 2008/0101291 A1 * | 5/2008 | Jiang et al. .................... 370/331 |
| 2008/0240036 A1 | 10/2008 | Liu et al. |

FOREIGN PATENT DOCUMENTS

| | | |
|---|---|---|
| EP | 1081909 | 3/2001 |
| EP | 1178646 | 2/2002 |
| EP | 1213941 | 6/2002 |
| EP | 1257141 | 11/2002 |
| EP | 1278143 | 1/2003 |
| EP | 1395076 | 3/2004 |

| | | |
|---|---|---|
| EP | 1597868 | 11/2005 |
| GB | 2322051 | 8/1998 |
| GB | 2377130 | 12/2002 |
| GB | 2391432 | 2/2004 |
| JP | 2000-092541 | 3/2000 |
| JP | 2001-258058 | 9/2001 |
| JP | 2003-264868 | 9/2003 |
| JP | 2004-320473 | 11/2004 |
| JP | 2004-349976 | 12/2004 |
| KR | 2000-0060796 | 10/2000 |
| KR | 2002-0037564 | 5/2002 |
| KR | 2004-0051329 | 6/2004 |
| TW | 243573 | 3/1995 |
| TW | 300943 | 3/1997 |
| WO | 96/36190 | 11/1996 |
| WO | 99/67902 | 12/1999 |
| WO | 00/04718 | 1/2000 |
| WO | 00/60895 | 10/2000 |
| WO | 00/65802 | 11/2000 |
| WO | 01/28154 | 4/2001 |
| WO | 01/31963 | 5/2001 |
| WO | 01/35585 | 5/2001 |
| WO | 01/58177 | 8/2001 |
| WO | 01/69858 | 9/2001 |
| WO | 02/11358 | 2/2002 |
| WO | 02/13157 | 2/2002 |
| WO | 02/30133 | 4/2002 |
| WO | 02/062094 | 8/2002 |
| WO | 02/080605 | 10/2002 |
| WO | 03/003639 | 1/2003 |
| WO | 03/024144 | 3/2003 |
| WO | 03/045095 | 5/2003 |
| WO | 03/054721 | 7/2003 |
| WO | 03/079660 | 9/2003 |
| WO | 2004/006482 | 1/2004 |
| WO | 2004/089021 | 10/2004 |
| WO | 2004/100452 | 11/2004 |
| WO | 2005/051026 | 6/2005 |

OTHER PUBLICATIONS

IEEE P802.21/D01.00, Mar. 2006, Draft IEEE Standard for Local and Metropolitan Area Networks: Media Independent Handover Services.

Jassemuddin, "An Architecture for Integrating UMTS and 802.11 WLAN Networks." Proceedings of the 8th IEEE International Symposium on Computers and Communication, 2003, pp. 716-723.

Morand et al., "Global Mobility Approach with Mobile IP in "All IP" Networks," IEEE International Conference on Communications, ICC 2002, vol. 4, pp. 2075-2079, (2002).

Parkvall, "Long-Term 3G Radio Access," Ericsson Research (Nov. 12, 2005).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4);" 3GPP TS 44.060 V4.13.0 (Sep. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4);" 3GPP TS 44.060 V4.18.0 (Sep. 2004).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5);" 3GPP TS 44.060 V5.8.0 (Sep. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5);" 3GPP TS 44.060 V5.13.0 (Sep. 2004).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6);" 3GPP TS 44.060 V6.4.0 (Sep. 2003).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6);" 3GPP TS 44.060 V6.9.0 (Sep. 2004).

Third Generation Partnership Project, "Technical Specification Group Services and System Aspects; Feasibility study on 3GPP system to Wireless Local Area Network (WLAN) interworking; (Release 6), " 3GPP TR 22.934 V6.2.0 (Sep. 2003).

Third Generation Partnership Project, "Technical Specification Group Services and System Aspects; 3GPP system to Wireless Local Area Network (WLAN) interworking; (Release 6), " 3GPP TS 22.234 V2.0.0 (Sep. 2003).

Third Generation Partnership Project, "Technical Specification Group Radio Access Network; Radio Resource Control (RRC); Protocol Specification (Release 4)," 3GPP TS 25.331 V4.11.0 (Sep. 2003).

Third Generation Partnership Project, "Technical Specification Group Radio Access Network; Radio Resource Control (RRC); Protocol Specification (Release 4)," 3GPP TS 25.331 V4.15.0 (Sep. 2004).

Third Generation Partnership Project, "Technical Specification Group Radio Access Network; Radio Resource Control (RRC); Protocol Specification (Release 5)," 3GPP TS 25.331 V5.6.0 (Sep. 2003).

Third Generation Partnership Project, "Technical Specification Group Radio Access Network; Radio Resource Control (RRC); Protocol Specification (Release 5)," 3GPP TS 25.331 V5.10.0 (Sep. 2004).

Third Generation Partnership Project, "Technical Specification Group Services and System Aspects; 3GPP system to Wireless Local Area Network (WLAN) interworking; System description (Release 6), " 3GPP TS 23.234 V6.2.0 (Sep. 2004).

Third Generation Partnership Project, "Technical Specification Group Radio Access Network; Radio Resource Control (RRC); Protocol Specification (Release 6)," 3GPP TS 25.331 V6.3.0 (Sep. 2004).

UMA Architecture (Stage 2) R1.0.4, May 2, 2005, Unlicensed Mobile Access (UMA); Architecture (Stage 2).

Zhang et al., "Integration of Wireless LAN and 3G Wireless—Efficient Mobility Management for Vertical Handoff between WWAN and WLAN,".

\* cited by examiner

US 8,014,367 B2

SYSTEM FOR APPLICATION SERVER AUTONOMOUS ACCESS ACROSS DIFFERENT TYPES OF ACCESS TECHNOLOGY NETWORKS

CROSS REFERENCE TO RELATED APPLICATIONS

This application claims the benefit of U.S. Provisional Application No. 60/519,440 filed on Nov. 12, 2003, and U.S. Provisional Application No. 60/623,091 filed on Oct. 28, 2004, which are incorporated by reference as if fully set forth.

FIELD OF INVENTION

The present invention is related to wireless communication systems. More particularly, the present invention is related to a system which permits access to an infrastructure by devices employing different types of access technology.

BACKGROUND

Current technology allows different types of wireless and wireline access networks to offer service to subscribers. Support of mobility inter-working between different access technologies, for example, second and third generation (2G/3G) wireless networks, code division multiple access 2000 (CDMA 2000) networks, wireless local area network (WLAN)/Bluetooth® networks, exists to a very limited degree at the radio access network (RAN) level. Standardization work, in the area of WLAN and Global Standard for Mobile Units (GSM)/Universal Mobile Telecommunication System (UMTS) inter-working is in progress. However, the mechanisms being defined address mobility between these networks within the radio access domain. As such, these efforts factor in only wireless, (i.e., RAN), criteria into their schemes. A mechanism is needed whereby "application level" integration is possible across heterogeneous access networks, allowing seamless mobility and inter-working to occur between these systems.

SUMMARY

The present invention solves the problems associated with prior art interoperability problems. The present invention is an Application Server Autonomous Access (ASAA) system that brings together different types of wireless and wireline access networks. It allows a potentially non-Public LAN Mobile Network, 3rd-party service provider to provide services to subscribers, based on user location, behavioral preferences, tariffing criteria, etc. The ASAA network consolidates location, service and routing information for users as they roam between different types of access networks. The ASAA network provides flexible routing of calls and push services to users via the appropriate technology network, based upon criteria such as user location, behavioral preferences and tariffing preferences. The architecture of the ASAA network allows different types of services to be offered to the user based upon the same criteria. In essence, this architecture allows a 3rd-party service provider to draw significant revenues from, (and away from), wide-area PLMN networks, (such as GSM/UMTS and CDMA 2000 networks).

DETAILED DESCRIPTION OF THE PREFERRED EMBODIMENTS

As used herein, the terminology "wireless transmit/receive unit" (WTRU) includes but is not limited to a user equipment, mobile station, fixed or mobile subscriber unit, pager, or any other type of device capable of operating in a wireless environment. The terminology "base station" includes but is not limited to a Node B, site controller, access point or any other type of interfacing device in a wireless environment. An "access point" (AP) is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

According to the present invention, wireless telecommunication services are provided to at least one WTRU by identifying at least a plurality of wireless access networks capable of providing wireless links to the WTRU. A server is capable of communicating with a plurality of the wireless access networks and determines a status of the WTRU in the sense of an ability to establish a radio link with one or more of the wireless access networks. The server establishes a server communication link a wireless access networks with which the WTRU has an ability to establish a radio link and uses the communication link to establish communication between the WTRU. The server communication link is then used to establish communication between the WTRU and a further destination through one of the access networks.

The ASAA server consolidates location, service and routing information for subscribed users. The ASAA server also routes calls and push-services to a user's appropriate serving network, based on policy profiles. These profiles include, for example, location, technology network capabilities, behavioral factors and tariffing criteria. The ASAA network uses IP-based technologies (e.g. SIP) to support inter-technology convergence.

Figure 1:
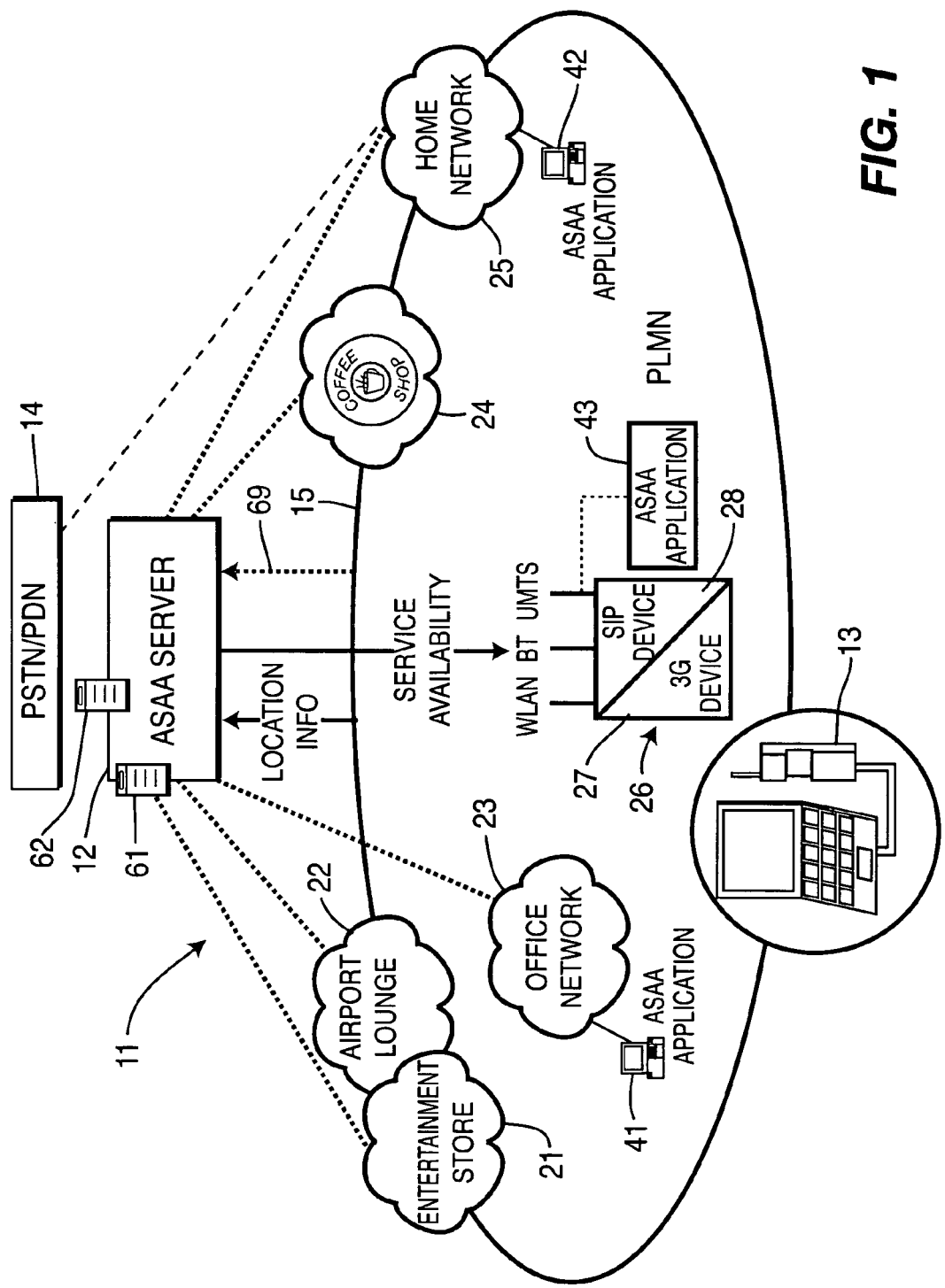
FIG. 1 is a diagram showing an ASAA network implemented in accordance with the present invention.

FIG. 1 is a schematic diagram of an ASAA network 11, showing an exemplary relationship between an ASAA server 12, network service entities 21-26, and a WTRU 13 according to the present invention. The ASAA network 11 implemented in accordance with the present invention brings together different technology networks, such as: 3G wide-area PLMN (e.g., UMTS and CDMA 2000); private area networks (WPANs), for example office and campus networks (e.g., WLAN, Bluetooth, IEEE 802.11, IEEE 802.15 and ZigBee); and private SOHO networks (e.g., WLAN, Bluetooth, IEEE 802.15 and ZigBee). As shown in FIG. 1, in addition to the ASAA network 11 and the ASAA server 12, is a public switched telephone network or public data network (PSTN/PDN) 14 and a public land mobile network (PLMN) 15.

While certain protocols, such as IEEE 802.15, are described, a number of suitable protocols can be used for communications within the scope of the present invention. These are described by way of example and it is contemplated that other communication techniques and protocols, such as ZigBee, UWB and IrDA, will be used to implement the inventive concepts.

The PLMN 15 includes a plurality of LANs 21-25, depicted as an entertainment store 21 at an airport location, an airport lounge 22, an office network 23, a coffee shop 24 offering WLAN services, and a home network 25. The PLMN 15 also includes a network 26 offering large area mobile services, which in the example includes a 3G device 27 and a SIP device 28. The large area mobile services network 26 provides communication via WLAN, BT and UMTS. The LANs 21-25 and large area mobile services network 26 form access networks. Typical communications through the LANs 21-25 are according to the IP protocol, SIP protocol or other packet-switched protocols. Typically, such communications use a common channel and are assigned bandwidths according to demand.

A plurality of ASAA application servers 41, 42 and 43 are provided at various locations including at the office network 23, the home network 25 and the large area mobile services network 26. The ASAA application servers 41, 42 and 43 provide application services through their respective access networks 23, 25 and 26, but are also accessible through other access networks.

The WTRU 13 is depicted and is able to communicate with various ones of the access networks 21-26. The ASAA server 12 is able to establish a communication link with the WTRU 13 by connecting directly or indirectly to individual ones of the networks 21-26 to which the WTRU 13 has established a communication link. The services come from the ASAA server in this architecture. The access networks provide access to the user and hence, calls and other interactions between the user and the ASAA server are routed through the access network to which the user is connected. This enables the ASAA server 12 to function as a service platform in order to deliver services to the user through the various ones of the access networks 21-26.

The WTRU 13 is able to communicate through various services as provided via the WLAN 23, but once connected, the ASAA server 12 can provide administrative functions to either provide services directly through the ASAA server 12, or request that services be routed between the various access networks 21-26 to an access network connected to the WTRU 13. The services are provided by the ASAA server 12 in this architecture. The access networks provide access to the WTRU 13, and hence calls and other interactions between the WTRU 13 and the ASAA server 12 are routed through the access network 21-26 to which the WTRU 13 is connected.

The ASAA server 12 also includes server function modules 61, 62. The server function modules 61, 62 provide administrative functions for operating the ASAA server 12, and maintaining a database of locations of the WTRU 13 and availability of connections to the access networks 21-26. The server function modules 61, 62 also provide application functions which can be executed by the WTRU through connections to the access networks 21-26.

The ASAA server 12 provides an anchored interface to the PSTN/PDN 14 for receipt/transmission of call attempts, and routes incoming calls to the WTRU's serving access network based on the WTRU's location. In routing incoming calls, the ASAA server 12 pages all underlying possible serving access networks configured for the WTRU 13. The WTRU 13 responds with a paging response, routed through currently connected serving network. The ASAA server 12 then delivers incoming calls, via a serving access network to which the WTRU 13 is currently connected.

The WTRU 13 can also "force-route" incoming call through a specified serving access network by configuring the ASAA server 12 appropriately, with the identity of serving access network to route the call through to its destination. By specifying the access network, the WTRU 13 can control which services are used.

This architecture broadens the traditional cellular paging and call routing mechanisms to work across a range of access networks. In one embodiment, an IP based application-level paging mechanism, which operates across a variety of access networks to help locate the WTRU 13 issued.

One embodiment includes a provision of a consolidated interface, via the ASAA server 12, to allow PSTN/PDN 14 receipt of calls. The ASAA server 12 allows PSTN/PDN 14 receipt of calls to be effected through a single anchor point. The effect is that, from the user's standpoint, radio link services are provided by the particular radio links, which are the individual ones of the access networks 21-26. The service management, which is the user's interface, can be either one of the local network 21-26 or the ASAA server 12. Thus as indicated by dashed line 69, the system shifts the network administration for the user's services and the service management for the user "upward" from the individual access networks 21-26 to the ASAA server 12. The ASAA server 12 then becomes a virtual server from the user's perspective. Network services are provided by the individual access networks 21-26 for the radio link, and by the ASAA server 12 for services provided to the user other than the radio link. If the operator of the ASAA server 12 is able to obtain wireless services as provided by the individual access networks 21-26, then the user is able to make service subscription arrangements with the operator of the ASAA server 12.

This architecture supports mobility of the WTRU 13 across multiple access networks, and helps locate the WTRU 13 seamlessly. The use of the ASAA server 12 allows for user-configured routing of calls through a given access network. This also provides a uniform set of supplementary services and features across multiple access networks, resulting in a continuity of user's experience despite network changes. The architecture also may provide a configuration for a uniform mechanism for provision of push services to the WTRU 13 across multiple underlying access networks.

The role of the ASAA server 12 providing an administrative function concerning routing of services to various access networks 12-26 makes the ASAA server 12 able to maintain a common location for user profiles. The user can determine what services to use, and under which physical circumstances. Examples of parameters include call handling, selection of services by type, selection of services by cost and cost structure, selection of services by network ownership, notification of availability of connections to services, user determined minimum quality of service (QOS), required bandwidth of services for a particular function. Call handling profile selection functions can include voicemail, selective admission of calls and "challenge" responses. In a similar manner, the ASAA server 12 can also provide the voicemail and other data management services.

Figure 2:
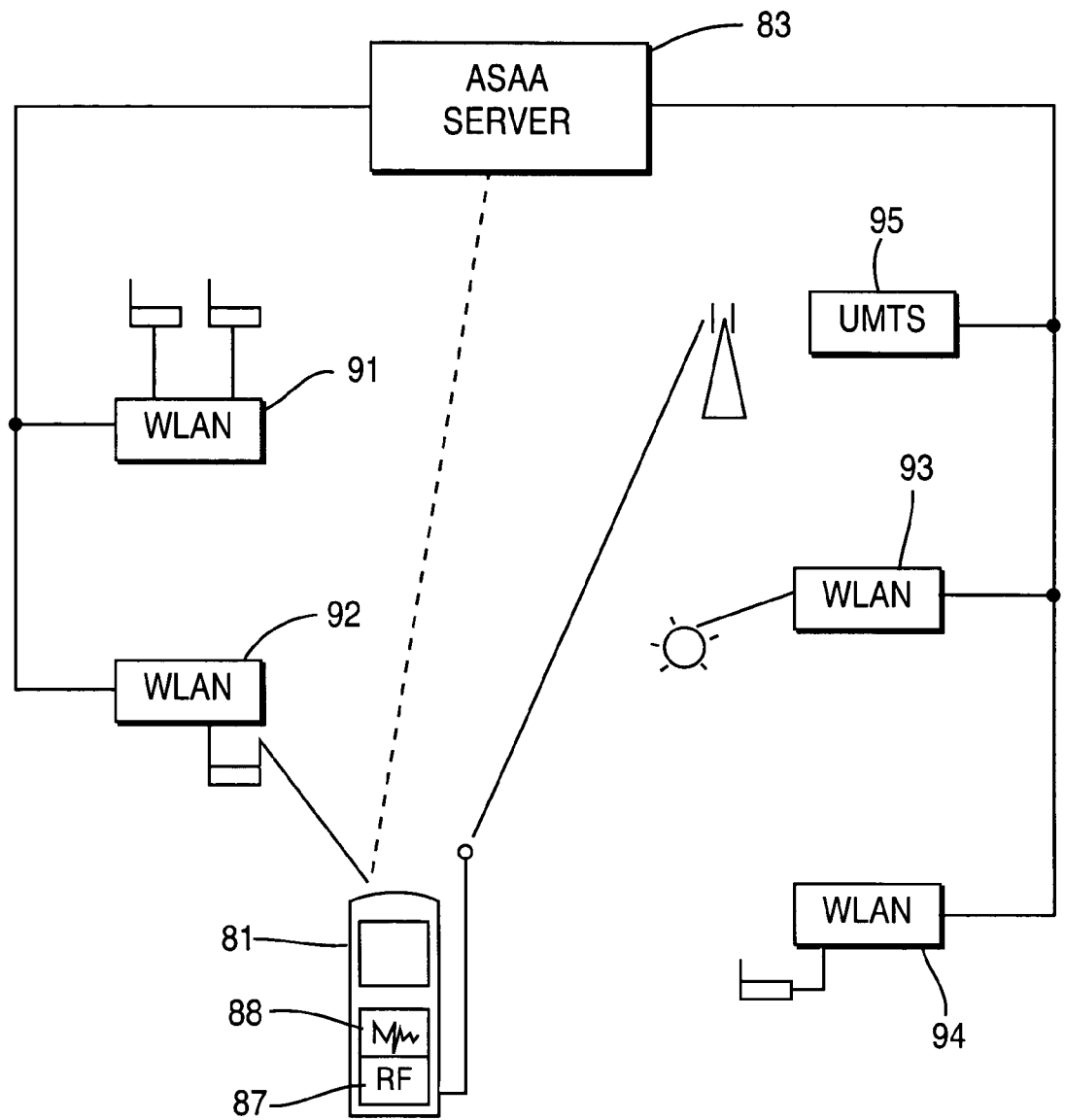
FIG. 2 is a diagram showing the relationship between a WTRU, an ASAA server and access networks.

FIG. 2 is a diagram showing the relationship between a WTRU 81, an ASAA server 83 and access networks 91-95. The WTRU 81 includes a first circuit 87 for establishing an RF link and a second circuit 88 for processing data, although some of these functions are integrated circuit functions. The WTRU 81 establishes a communications link with the ASAA server 83, but in general the service connection is between the WTRU 81 and one of the service networks 91-95. Services may be communicated either through the ASAA server 83 through the service network in radio communication with the WTRU 81. Alternatively, services may be communicated from one service network to a service network which establishes a radio link with the WTRU 81 without passing through the ASAA server 83. In the case of ASAA server supervised communications, communications which do not pass through the ASAA server 83 or originate with the ASAA server 83 may still be supervised by the ASAA server 83. Since the processing circuitry 88 handles the data regardless of its source, the actual connection to a particular service network 91-95 can be transparent to the user.

In operation, upon energization of the media device, the ASAA application attempts to access the ASAA server 83 via the 3G PLMN infrastructure. This registration action will result in the regular transmission of location information between the PLMN and the ASAA application server.

The ASAA server 83 will maintain a catalog of subnetworks available to the media device and, during the life of the session, may push the media device onto these subnetworks automatically, or upon some user command following an ASAA system prompt. This push action is policy-based. By way of example, server policies may include user location, behavioral profiling, and optimal tariffing.

During the lifetime of the session, the ASAA network provides the connectivity between the media device and the PSTN/PDN. Depending on ASAA and PLMN subscription, (such as the quality of service profile), different levels and types of services may be offered to the media device. This may also dependent upon location.

By way of example, a general PLMN voice service may not be necessary to a user having a behavioral profile that places the user at home or in the office for a large percentage of normal time. For such a user, a simple ASAA (SIP-based) paging scheme may be applied during times of subnetwork unavailability.

The ASAA system in accordance with the present invention results in several advantages over current systems. The ASAA system consolidates location, service and routing information for subscribed users at the ASAA Server 83. This permits seamless communication provision of seamless mobility between different technology networks, using a common IP-based scheme. The system routes calls and push services to the appropriate technology network based on policy profiles. The system also supports a flexible tariffing scheme based on a user's location and choice of technology network. Finally, the system enables 3rd-party application providers to extract services revenue from wireless networks.

A further advantage of the ASAA system is that the ASAA server 83 can assign a virtual identity to the WTRU 81, which for example can be a user identity. In this way, the user identity can be made portable across different WTRUs. Thus, if each WTRU has a unique identity, the ASAA server 83 can communicate with the various WTRUs according to their identities such as ESN numbers. The communication of the ASAA server 83 can be in response to different identity as selected by the user. This permits a user to "clone" a WTRU such as a cellular telephone by using the ASAA server 83. The ASAA server 83 can then communicate with a different WTRU in order to provide information corresponding to the identity. Therefore, a user can use a different physical device, with its own identity in place of a particular WTRU. Conversely, multiple different user IDs may be mapped onto a single device by the ASAA server 83. In either case, the ASAA server 83 provides an identity proxy service for the WTRU.

By way of example, the user may wish to have a personal cellphone and a work cellphone on a trip, but only carry a single physical device. Instead of using call forwarding services, the user may communicate under the supervision of the ASAA network which is able to communicate with the physical device which the user is carrying. Since this is under the supervision of the ASAA network, the ASAA server 83 can convert device information such as telephone number or other identifying data in accordance with information registered on the database of the ASAA server 83.

Remote Camera Device

Figure 3:
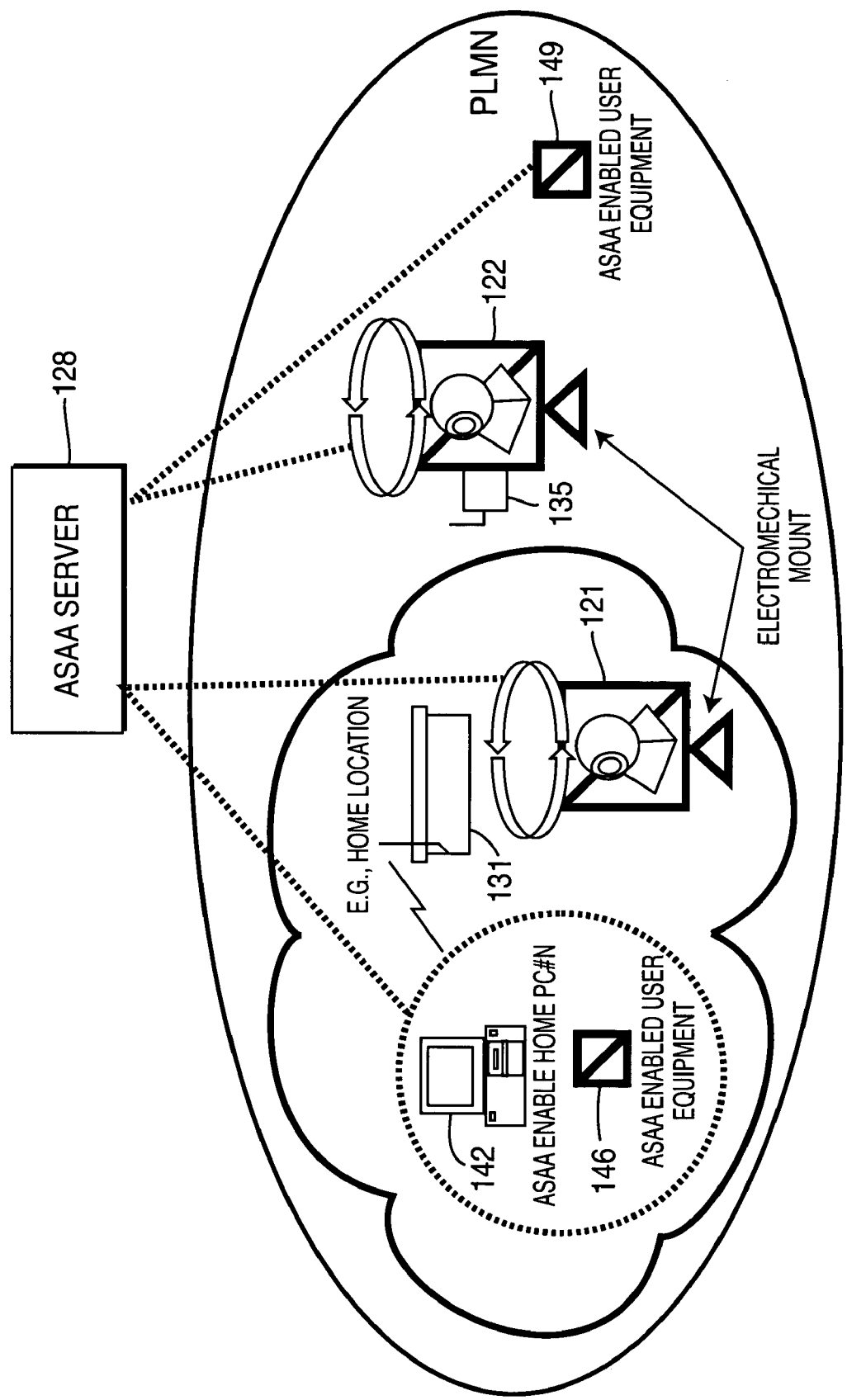
FIG. 3 is a diagram showing an ASAA network implementation of a remote video media function in accordance with one aspect of the present invention.

FIG. 3 is a diagram showing an ASAA network implementation of a remote video media function in accordance with one aspect of the present invention. As can be seen, camera devices 121 and 122 are connected through network connections which provide virtual connections to an ASAA server 128. The actual connections of the camera devices 121 and 122 may be either through a LAN, such as WLAN 131, or through a WTRU 135 capable of effecting a cellular connection. WTRU 135 may be a separate device connected through a local connection such as an IEEE 802.15 connection or may be self-contained in or hardwired to the camera device 122. In each case, communication is effected which can be controlled by the ASAA server 128.

Also shown in FIG. 3 is a PC 142 which is able to communicate with the ASAA server 128 through either through WLAN 131 or through another connection such as a direct internet connection. A local WTRU 146 communicates with the ASAA server 128 either directly or through the WLAN 131. Likewise a WTRU 149 may be located at a separate location and communicate with the ASAA server 128. The ASAA server 128 may provide a virtual identity to the WTRU 149 or the camera device 122 as described supra.

Figure 4:
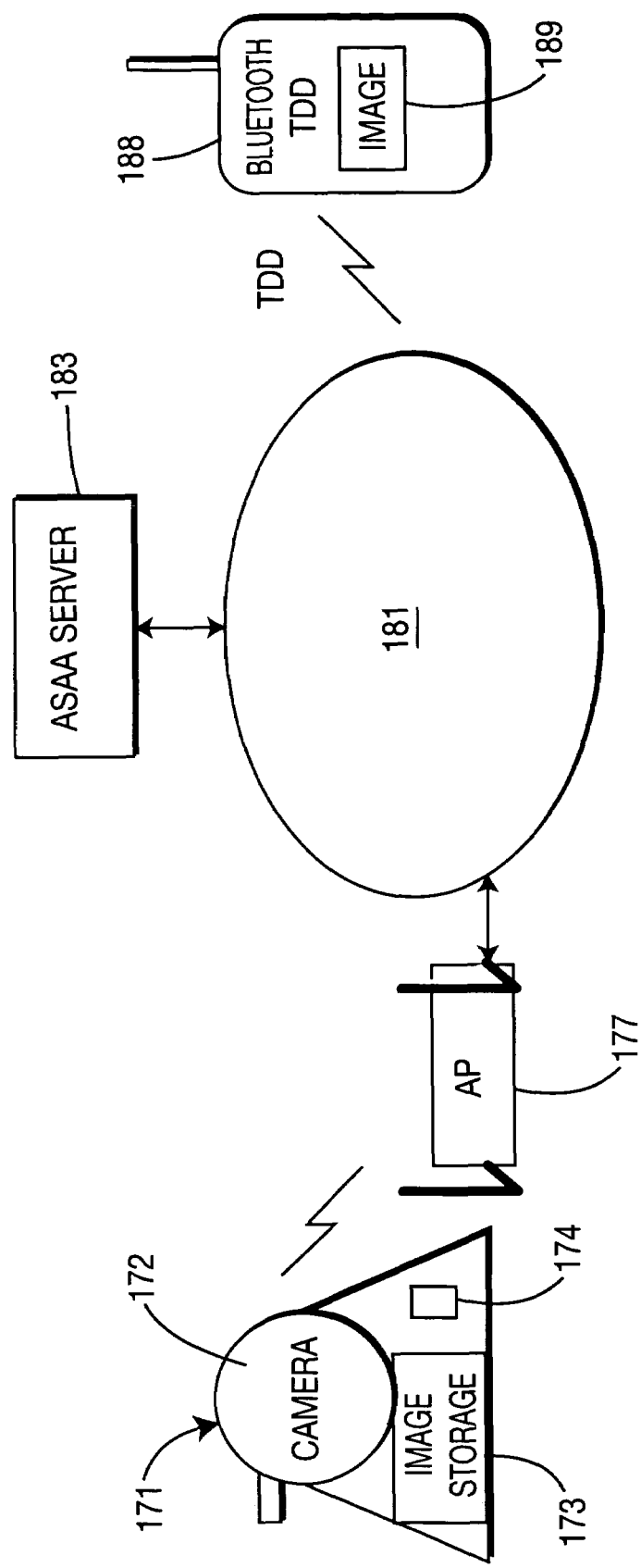
FIG. 4 is a schematic diagram showing a remote control connection of a camera device implemented in accordance with one embodiment of the present invention.

FIG. 4 is a schematic diagram showing a remote control connection of a camera device 171 implemented in accordance with one embodiment of the present invention. This remote control is performed either through the ASAA network of FIGS. 1-3 or through network services. FIG. 4 shows a one-way transmission of images through a two-way link. The camera device 171 includes a camera with associated image processor 172, an image storage device 173 and a transceiver 174. The camera device 171 communicates through an access point (AP) 177, which, in turn, communicates with an ASAA network 181 under the control of an ASAA server 183.

The ASAA network 181 connects with a user's WTRU 188, which provides an image through display 189. The user's WTRU 188 is able to control the camera device 171 through the communications link established by the camera device 171, AP 177, ASAA network 181 and WTRU 188. Control can be open or restricted by controlled access. In the case of restricted control of the camera device 171, this may be either in accordance with the particular terminal providing control instructions or requesting outputs, in accordance with establishment of a secure connection, or by means of authentication by password or other user information.

In order to communicate with the camera device 171, the ASAA network 181 provides a registration of the camera device 171. Communications with the camera device are effected through the ASAA network 181 under the supervision of the ASAA server 183. It is also possible to effect other network connections (not shown). Therefore, control and access to the output of the camera device 171 is achieved in a controlled manner. This means that in order to access the camera device 171 through the ASAA server 183, one must either be registered through the ASAA server 183 or have been granted access. One advantage of using the ASAA server 183 is that any user with access to the ASAA network can be provided with access to the camera device 171 in accordance with the registration.

In use, if the camera device 171 is to have restricted use for privacy or utility reasons, then the control of the camera device 171 is established by an authorized user. The authorized user can be given control of the camera device 171 by the ASAA server 183 and can proceed to control the camera device either through the ASAA server or through a connection authorized by the ASAA server 183. Thus, the camera can be reserved for use by particular individuals such as family members, or lesser restrictions may be permitted. Therefore, while the network link used by the camera device may inherently be open to outside control of viewing, the ASAA server permits owner control while permitting wide access by the owner and those authorized by the owner.

Figure 5:
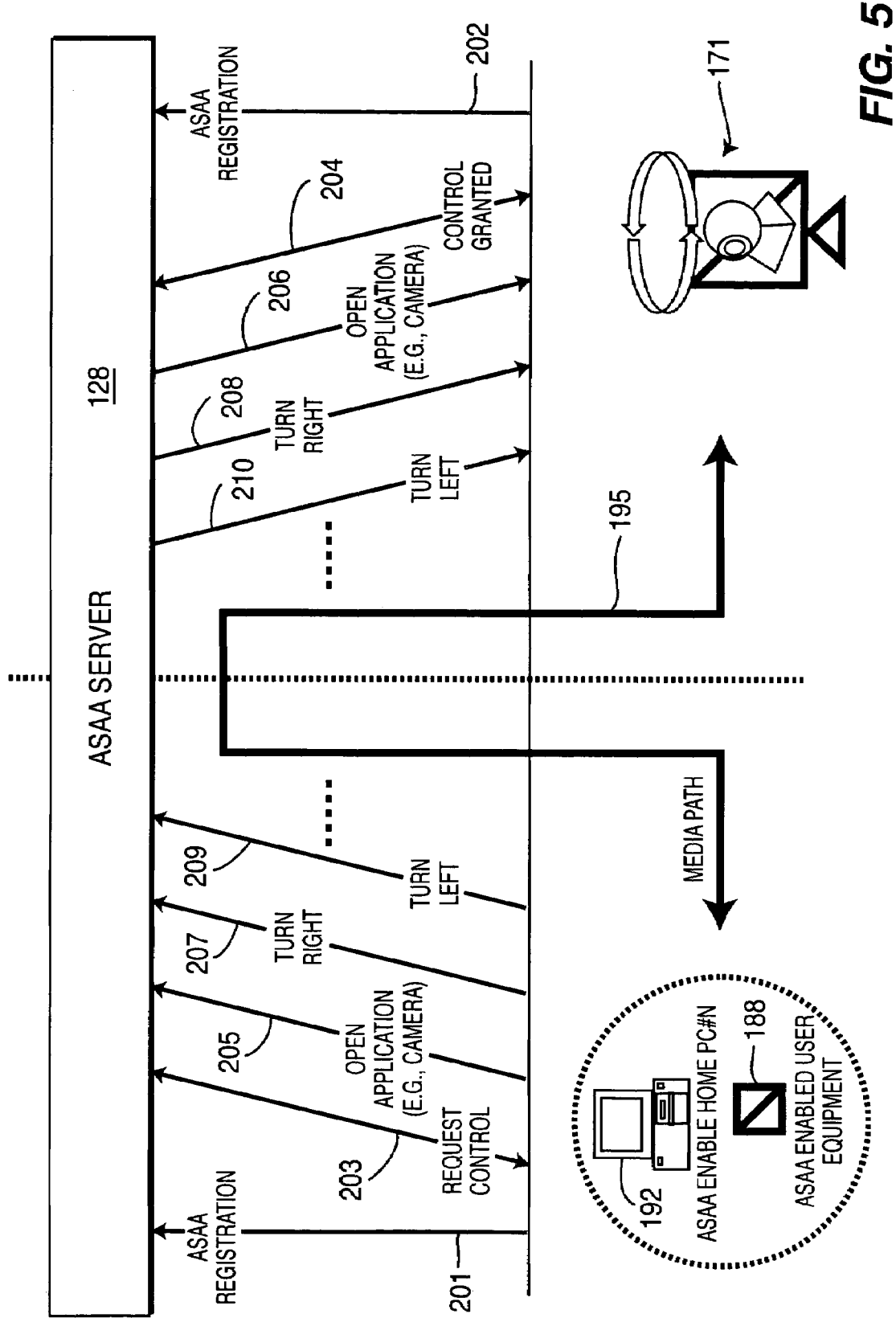
FIG. 5 is a schematic diagram showing a remote control operation of a camera device implemented in accordance with one embodiment of the present invention.

FIG. 5 is a schematic diagram showing a remote control operation of the camera device 171 implemented in accordance with one embodiment of the present invention. The camera device 171 is controlled remotely by a remote terminal such as terminal 192 or by WTRU 188. Control operations are executed under the supervision of the ASAA server 128 which provides control between the WTRU 188 or terminal 192 and the camera device 171. In addition, a media path 195 may be established through the ASAA server 128, under the supervision of the ASAA server 128 or independently. While the execution of commands is depicted as directly between the camera device 171, WTRU 188, terminal 192 and the ASAA server 128, it is anticipated that the ASAA server will use intermediary network connections for providing these signals.

Registration with the ASAA server 128 is established by the WTRU 188 or the terminal 192 registering 201, 202 separately as devices accessible by the ASAA server 128. A control request 203 is made by the terminal and is granted 204. The terminal then opens the application 205, 206 which in this case is the camera control. This is followed by commands such as turning commands 207-210. In addition, the terminal can access the camera output as indicated by media path 195 may be restricted by the ASAA server 128.

Personal Communication Lock and Key

Communication across a network incorporates a variety of wired and wireless devices. In instances where security is required a personal lock and key device provides controlled secure access to communication, service and data. According to the present invention, a separate personal lock and key device is used in order to implement the security by effecting a wired dongle or local wireless connection with a local device operated by the user. The local device can be a WTRU, a terminal under the control of the user or a public terminal being used by the user. The personal lock and key device is able to provide multiple functions, which may include: 1) communication with a security server which provides security data to servers offering services to the user; 2) dongle security by encryption and decryption of signals processed by a local terminal or WTRU; 3) storage of password information which can be decrypted through the security server; 4) communication with multiple security servers; and 5) providing password access and security data to servers according to the server's protocol independently of the security server.

Figure 6:
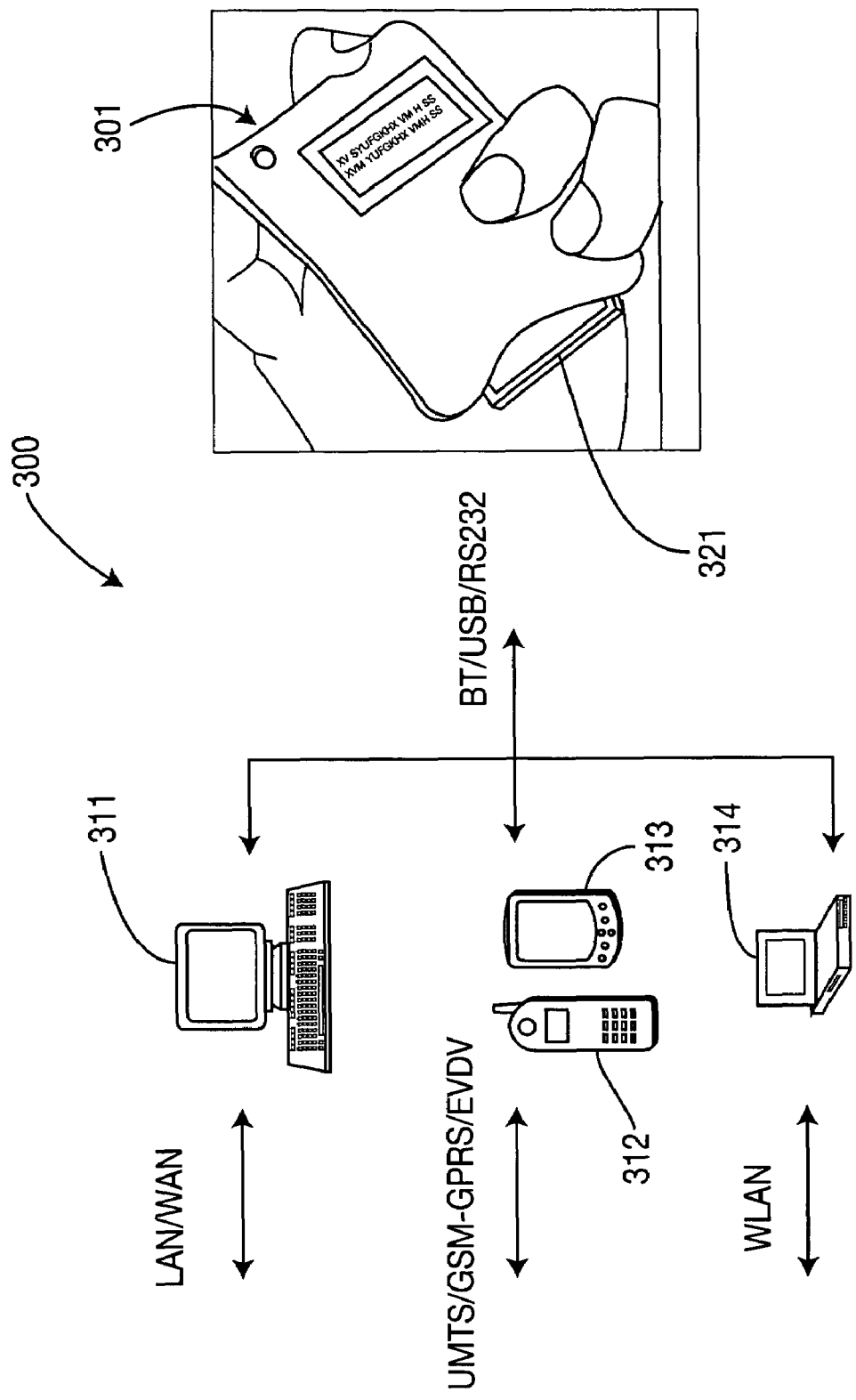
FIG. 6 is a diagram showing a user interface of a personal lock and key device which provides secure communication over an ASAA network in accordance with a particular aspect of the present invention.

FIG. 6 depicts the user end of a network environment 300 with a personal lock and key device 301 used to provide secure access through a computer terminal 311, WTRUs 312, 313, and a portable computer 314 connected through a WTRU, (not separately depicted). The personal lock and key device 301 is convenient in that a single device is able to be used in connection with the various user devices without a requirement to provide separate equipment for each terminal device 311-314. In instances where the personal lock and key device 301 is not necessary for operation of the terminal device 311-314, the personal lock and key device 301 can be conveniently stowed because it has a limited profile for physical connection, and has either no user interface or a limited user interface.

The personal lock and key device 301 can use data stored internally. In addition, the personal lock and key device 301 is able to read further security data, such as that provided by an external card device 321. This enables separate secure devices to operate in conjunction with the personal lock and key device 301 without a direct association between the protocol used by the external card device 321 and the personal lock and key device 301. The personal lock and key device 301 would be expected to communicate with the separate, external card device 321 and with external services, but would not otherwise be required to share a protocol with the external card device 321.

Figure 7:
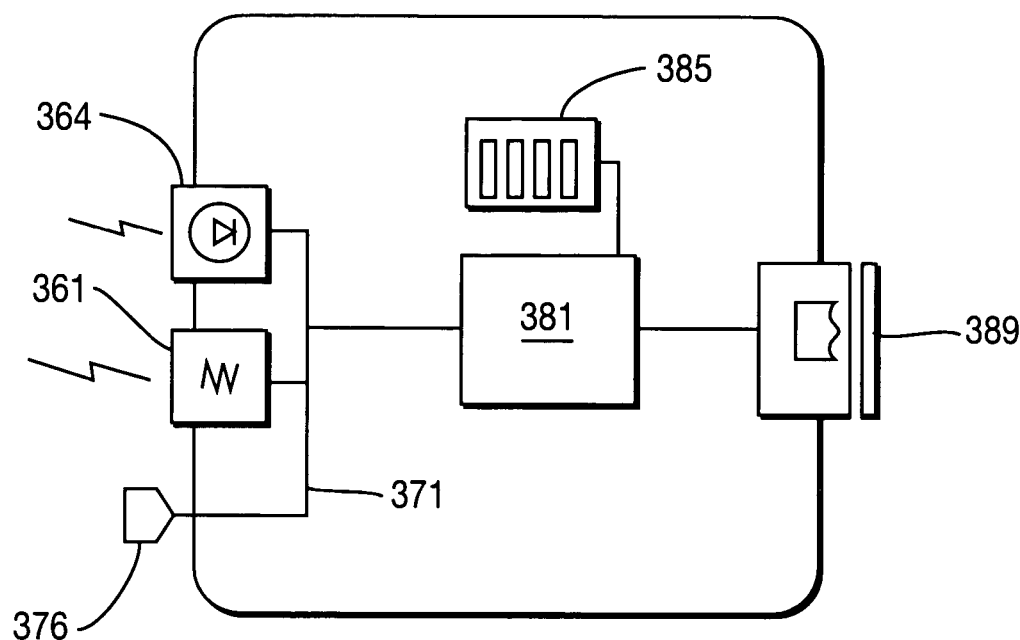
FIG. 7 is a block schematic diagram showing the operational functions of the personal lock and key device of FIG. 6.

FIG. 7 is a block schematic diagram showing the operational functions of the personal lock and key device 301 of FIG. 6. A wireless communication circuit 361 such as an IEEE 802.15 or BlueTooth™, and an infrared port 364 provides communication to a connection bus 371, which also has an external port connection 376. The connection bus 371 communicates with a logic circuit 381, which receives signals transferred to the connection bus 371 from the wireless communication circuit 361, infrared port 364 or external port connection 376. The logic circuit 381 provides signals to the connection bus 371 for transmission through the wireless communication circuit 361, infrared port 364 or external port connection 376. The logic circuit 381 uses encryption/decryption data stored in a memory store 385 for decryption or encryption of data transferred through the connection bus 371.

A card reader circuit 389 receives data from an external card (321, FIG. 6) for communication through the connection bus 371 which communicates with the wireless communication circuit 361, infrared port 364 or external port connection 376 as described above. The external card reader 389 may obtain complete data conversions or may provide data for use by the logic circuit 381 for conversion. In the case of the complete data conversion obtained by the external card reader 389, the logic circuit 381 transfers the data as received to or from the connection bus 371 to or from the external card reader 389. In the case of data provided for use by the logic circuit 381 by the external card reader 389, the data is used by the logic circuit 381 to convert data transferred through the connection bus 371. It is also understood that the logic circuit 381 may use a combination of data converted externally and transferred by the external card reader 389 along with data converted by the logic circuit 381.

Figure 8:
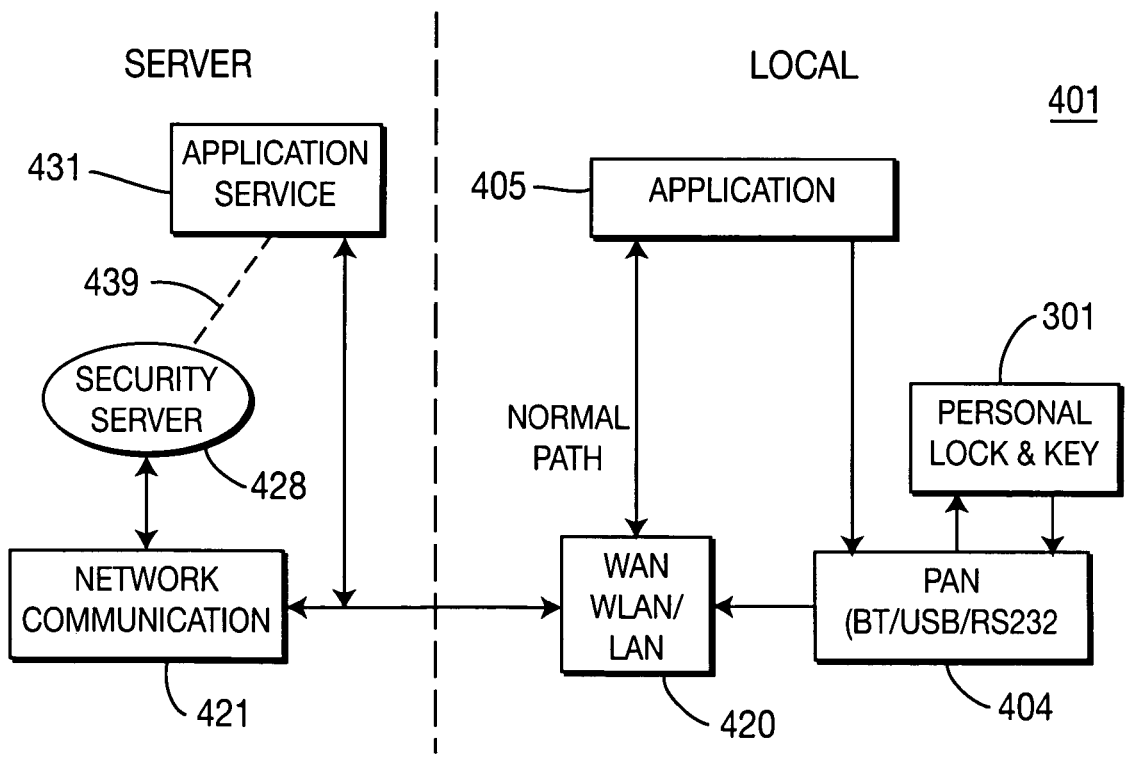
FIG. 8 is a diagram showing the interoperability of the personal lock and key device of FIG. 6 with a terminal or WTRU application.

FIG. 8 is a diagram showing the interoperability of the personal lock and key device 301 and secure services. A local application device 401, which is a local terminal, includes an application 405 and a dongle port 404. The dongle port 404 may be a physical dongle such as a USB port, a wireless communication port or other communication port. The purpose is to permit the personal lock and key device 301 to receive data from the local application device 401 and transmit data back to the local application device 401. The use of an external dongle decryption device is known to those skilled in the art.

The local application device 401 communicates through network connections 420 and 421 to a security server 428, which provides encryption data that cooperates with the personal lock and key device 301. The security server 428 communicates with the personal lock and key device 301 to provide and receive encrypted data across the network connections 420 and 421.

The security server 428 may retain data and provide program services. Additionally, services may be provided externally of the security server 428, as represented by application service server 431. The security server 428 may communicate with the application service server 431 with secure protocols which may be the same or different protocols used for the security server 428 to communicate through the local application device 401 and the personal lock and key device 301. As depicted, secure communication between the application service server 431 and the security server 428 may be through network connection 421, but the communication link is effectively secured between the application service server 431 and the security server 428 so as to be inaccessible from the outside as represented by dashed line 439. In that respect, the security server 428 may store user keys and passwords and respond to communication requests by communicating with personal lock and key device 301. When personal lock and key device 301 is identified, the security server 428 communicates the necessary access information.

By way of example, the user may with to access a private directory (such as a private list of names, customer list or other confidential data). The directory is resident on a server which offers access to the directory only in a secure manner, so that there is no public access to the directory. The user may connect at the local application device 401, which may be a public terminal, and request access to the security server 428. The security server 428 provides data which is accessible only through the personal lock and key device 301, and further uses the personal lock and key device 301 to authenticate the user. Thus data is provided to the user only in the form requested by the user, and with essential elements in a format which is only readable through the personal lock and key device 301. Therefore only displayed data selected by the user would be accessible at the public terminal 401 and would only be retrieved when the personal lock and key device 301 is connected to the dongle port 404. Thus, the data transferred cannot be "sniffed" in unencrypted form from the network connections 420 and 421. Only the data provided back to the public terminal 401 for local display or manipulation can be detected through access to the public terminal 401.

The data can be stored at the security server 428 in the manner of passwords, or can be stored elsewhere, as at application service server 431. In the example, if the data is stored at the application service server 431, then data is transferred between the application service server 431 and the security server 428, and then transferred to the public terminal 401, where it is decrypted by the personal lock and key device 301. The processing of the data can occur at any convenient location, including the public terminal, application service server 431 or the security server 428.

In another example, secured data is stored at an application service server 431. The user wishes to download a data output to the local application device 401, which may be a laptop computer. The data output is to be manipulated or displayed at the laptop computer 401. The user requests the service by providing authentication between the personal lock and key device 301 and the security server 428. The security server responds by providing authentication between itself. The application service server 431 provides the service as requested and returns a data output. The data output is then provided either directly to the user or to the user through the security server 428. The data output may be provided in encrypted form, to be decrypted by the personal lock and key device 301, or in unencrypted form, as appropriate for the particular type of data. For example if the data output is a name and telephone number derived from a confidential list, it is possible that the user doesn't consider a single name and number to be confidential and would rather have it freely accessible locally.

The security server 428 may be a separate device accessible through communication links or may be provided as a function of the ASAA server 12. In the case of the ASAA server 12, the secure functions can be implemented across divers networks while maintaining secure connections according to the protocols supported by the personal lock and key device 301.

As depicted in FIG. 6, the personal lock and key device 301 may use self-contained data, or may use data provided the external card device 321. This permits the personal lock and key device 301 to be used as an interface between the external card device 321 and the local application device 401, as depicted in FIG. 8. It is further contemplated that the lock and key device 301 will be conveniently mountable to at least one further device such as a WTRU. This enables the lock and key device 301 to communicate through the WTRU in order to execute its function.

The ability to connect through a further device is also useful in circumstances in which a particular device cannot connect to the personal lock and key device 301. For example if a device may be unable to connect to the personal lock and key device 301 but is connected to a WTRU for wireless connectivity. In such a case the WTRU is connected to both the lock and key device 301 enabling security, and to the device, thus providing secured wireless connection.

It is possible to include biometric identification functions in the lock and key device 301. This would require a biometric identification and authentication procedure, so as to restrict use of the lock and key device 301 to the owner. Examples of biometric functions would include a physical feature reader, voice matching circuitry or other function which uniquely identifies the user. The biometric data may also be provided for purposes of use of a diverse device such as a camera to match a biometric attribute based on biometric data stored in the personal lock and key device 301.

The personal lock and key device 301 may be assigned an identity by the security server 428. Alternatively, the security server 428 may assign a virtual identity to a device, such as the local application device 401, through which the personal lock and key device 301 communicates.

What is claimed is:

1. A method of providing wireless telecommunication services, implemented in at least one network node, the method comprising:
   maintaining a mobility policy and a list of a plurality of access networks which are available for the wireless transmit/receive unit (WTRU) to connect, wherein the plurality of access networks comprise a first access network including a first access technology and a second access network including a second access technology that is different from the first access technology;
   communicating with the WTRU via the first access network using Internet Protocol (IP);
   obtaining a permanent identity for the WTRU;

sending mobility-related information regarding the first and the second access network to the WTRU based on the mobility policy and the permanent identity; and communicating with the WTRU via the second access network using IP in response to a transition of the WTRU from the first access network to the second access network.

2. The method of claim 1 further comprising communicating through a public data network (PDN).

3. The method of claim 1 further comprising receiving location information regarding the WTRU from a registration procedure.

4. The method of claim 1 wherein the mobility policy is based on location information.

5. The method of claim 1 wherein the mobility policy is based on access network profile information.

6. The method of claim 1 wherein the mobility policy is based on network capability information.

7. The method of claim 1 wherein the mobility-related information is provided to the WTRU via a push service.

8. The method of claim 1 wherein the first access network includes one of a wireless local area network (WLAN), a wireless private area network (WPAN), a universal mobile telecommunications system (UMTS) of a terrestrial radio access network (UTRAN), a code division multiple access (CDMA) 2000 network, a small office/home office (SOHO) network, a Bluetooth network, an IEEE 802.11 network, an IEEE 802.15 network or a ZigBee network.

9. The method of claim 1 wherein the second access network includes one of a wireless local area network (WLAN), a wireless private area network (WPAN), a universal mobile telecommunications system (UMTS) of a terrestrial radio access network (UTRAN), a code division multiple access (CDMA) 2000 network, a small office/home office (SOHO) network, a Bluetooth network, an IEEE 802.11 network, an IEEE 802.15 network or a ZigBee network.

10. A method of providing wireless telecommunication services, implemented in at least one network node, the method comprising:

maintaining a mobility policy and a list of a plurality of access networks which are available for the wireless transmit/receive unit (WTRU) to connect, wherein at least two of the plurality of access networks are based on different access technologies;

communicating with the WTRU via a first access network using Internet Protocol (IP);

obtaining a permanent identity for the WTRU:

sending mobility-related information regarding the first and the second access network to the WTRU based on the mobility policy and the permanent identity; and communicating with the WTRU via a second access network using IP in response to a transition of the WTRU from the first access network to the second access network;

wherein at least one of the first access network and the second access network is included in the list of the plurality of access networks.

11. The method of claim 10 further comprising communicating through a public data network (PDN).

12. The method of claim 10 further comprising receiving location information regarding the WTRU from a registration procedure.

13. The method of claim 10 wherein the mobility policy is based on location information.

14. The method of claim 10 wherein the mobility policy is based on access network profile information.

15. The method of claim 10 wherein the mobility policy is based on network capability information.

16. The method of claim 10 wherein the mobility-related information is provided to the WTRU via a push service.

17. The method of claim 10 wherein the first access network includes one of a wireless local area network (WLAN), a wireless private area network (WPAN), a universal mobile telecommunications system (UMTS) of a terrestrial radio access network (UTRAN), a code division multiple access (CDMA) 2000 network, a small office/home office (SOHO) network, a Bluetooth network, an IEEE 802.11 network, an IEEE 802.15 network or a ZigBee network.

18. The method of claim 10 wherein the second access network includes one of a wireless local area network (WLAN), a wireless private area network (WPAN), a universal mobile telecommunications system (UMTS) of a terrestrial radio access network (UTRAN), a code division multiple access (CDMA) 2000 network, a small office/home office (SOHO) network, a Bluetooth network, an IEEE 802.11 network, an IEEE 802.15 network or a ZigBee network.

* * * * *

UNITED STATES PATENT AND TRADEMARK OFFICE
CERTIFICATE OF CORRECTION

| | |
|---|---|
| PATENT NO. | : 8,014,367 B2 |
| APPLICATION NO. | : 10/987773 |
| DATED | : September 6, 2011 |
| INVENTOR(S) | : Carlton et al. |

It is certified that error appears in the above-identified patent and that said Letters Patent is hereby corrected as shown below:

ON THE TITLE PAGE

At Section (56) U.S. PATENT DOCUMENTS, page 2, right column, after "2004/0114553 A1* 6/2004 Jiang et al....370/328", delete "2004/0124241" and insert --2004/0127241--.

At Section (56) OTHER DOCUMENTS, page 3, right column, before "V2.0.0 (Sep. 2003)", delete "22.234" and insert --23.234--.

Signed and Sealed this
Seventh Day of February, 2012

David J. Kappos
*Director of the United States Patent and Trademark Office*